(12) United States Patent
Vince

(10) Patent No.: US 9,473,736 B2
(45) Date of Patent: Oct. 18, 2016

(54) MEDIAWORD COMPRESSION FOR NETWORK DIGITAL MEDIA RECORDER APPLICATIONS

(71) Applicant: ARRIS Enterprises, Inc., Suwanee, GA (US)

(72) Inventor: Lawrence D. Vince, Lansdale, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 262 days.

(21) Appl. No.: 14/062,129

(22) Filed: Oct. 24, 2013

(65) Prior Publication Data

US 2015/0121417 A1 Apr. 30, 2015

(51) Int. Cl.
| | |
|---|---|
| H04N 7/16 | (2011.01) |
| H04N 7/173 | (2011.01) |
| H04N 5/913 | (2006.01) |
| H04N 7/167 | (2011.01) |
| H04N 21/266 | (2011.01) |
| H04N 21/435 | (2011.01) |
| H04N 21/41 | (2011.01) |
| H04N 21/433 | (2011.01) |
| H04N 21/2347 | (2011.01) |
| H04N 21/4405 | (2011.01) |
| H04N 21/426 | (2011.01) |
| H04N 21/235 | (2011.01) |
| H04N 21/258 | (2011.01) |
| H04N 21/2747 | (2011.01) |
| H04N 5/765 | (2006.01) |
| H04N 9/804 | (2006.01) |

(52) U.S. Cl.
CPC .............. *H04N 5/913* (2013.01); *H04N 5/765* (2013.01); *H04N 7/1675* (2013.01); *H04N 7/17309* (2013.01); *H04N 9/8045* (2013.01); *H04N 21/2347* (2013.01); *H04N 21/2351* (2013.01); *H04N 21/25816* (2013.01); *H04N 21/26606* (2013.01); *H04N 21/26613* (2013.01); *H04N 21/2747* (2013.01); *H04N 21/4135* (2013.01); *H04N 21/42623* (2013.01); *H04N 21/4334* (2013.01); *H04N 21/4353* (2013.01); *H04N 21/4405* (2013.01); *H04N 2005/91364* (2013.01)

(58) Field of Classification Search
CPC ..................... H04N 21/2347; H04N 21/2351; H04N 21/42623
USPC ................................................... 725/25, 115
See application file for complete search history.

(56) References Cited

U.S. PATENT DOCUMENTS

| | | | |
|---|---|---|---|
| 2005/0196145 A1 * | 9/2005 | Nakamura | 386/94 |
| 2008/0170689 A1 * | 7/2008 | Boubion et al. | 380/260 |
| 2009/0254960 A1 * | 10/2009 | Yarom et al. | 725/115 |

(Continued)

*Primary Examiner* — Pankaj Kumar
*Assistant Examiner* — Franklin Andramuno
(74) *Attorney, Agent, or Firm* — Lori Anne D. Swanson

(57) ABSTRACT

In response to receiving from a subscriber both a request to record content and a unique requester key, a network DVR identifies an asset associated with the request. The network DVR segments the asset in to a series of segments, assigns a mediaword to each segment for compression, encrypts each of the segments using an encryption key, and records the encrypted asset segments in an encrypted dictionary storage as definitions, i.e., dictionary entries. The encrypted key and the mediaword are forwarded to a requester handler flow in the network DVR that generates requester-specific encrypted copies using the requester key received from the subscriber. The mediaword, encrypted encryption key, and the encrypted asset segments are stored in and retrievable for the corresponding requester.

19 Claims, 4 Drawing Sheets

(56) References Cited

U.S. PATENT DOCUMENTS

| | | | |
|---|---|---|---|
| 2010/0332401 A1* | 12/2010 | Prahlad et al. | 705/80 |
| 2013/0346483 A1* | 12/2013 | Alstad et al. | 709/203 |
| 2014/0040616 A1* | 2/2014 | Barber et al. | 713/168 |
| 2014/0282689 A1* | 9/2014 | Kummer | 725/31 |
| 2014/0344410 A1* | 11/2014 | Saremi et al. | 709/219 |

* cited by examiner

MEDIAWORD COMPRESSION FOR NETWORK DIGITAL MEDIA RECORDER APPLICATIONS

BACKGROUND

Today's television viewer increasingly uses a digital video recorder (DVR) to record television programs and play programs back at a later time. Traditionally, the DVR resides at the subscriber's location and connects locally to a display device. More recently, cable television operators have introduced network storage options for recording cable programming on central hard drives, called network DVRs. Network DVRs are housed at and maintained by the cable operator's remote location.

It is desirable to minimize the amount of storage and processing power needed to support the network DVR functionality in the network storage environment. For example, rather than store individual copies of the same media for each user, it would be beneficial to store a single copy of an asset that can be provided to multiple users. However, making a single common copy of an asset for playback by a plurality of users is a potential copyright violation, i.e. copying and redistributing content, without proper asset rights, may be deemed to create a rebroadcasting environment that violates copyright laws. Should any two persons record the same program it must, for legal reasons, be recorded and stored as separate copies. Thus, individual copies are made for each subscriber.

Storing a unique copy of content for each user, however, drives up storage costs in an nDVR deployment. The cost factor is further aggravated with having to store multiple formats necessary to support multiple screens.

Proposed solutions for archiving to a common copy over time to recover storage space are hindered by up front storage costs that are still very high and a lack of security of access to the common copy. For example, at some later point, the individual copies are archived for storing only one common copy in the archive that is never broadcast. If a copy is needed after the archival, the copy is generated from the archived copy for each subscriber that requests it. Making multiple copies of the single archived copy, therefore, is similar to the common copy violation where the system does not securely bind the archive to the original requester(s).

Thus, alternate techniques for employing DVR functionality in the network storage environment are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

It is noted that while the accompanying FIGS. serve to illustrate embodiments of concepts that include the claimed invention, and explain various principles and advantages of those embodiments, the concepts displayed are not necessary to understand all of the disclosed embodiments, as the details would be readily apparent to those of ordinary skill in the art having the benefit of the description herein.

DETAILED DESCRIPTION

Disclosed herein are techniques for effectively managing, at a network DVR, a plurality of copies of content for a plurality of users. It should be understood that while video is a common media type that may be selected for recording, a network DVR is a non-limiting example of a network digital media recorder. The disclosed concepts relate to a network digital media recorder and are not limited to recording video.

As described in more detail below, the disclosed techniques include, in response to receiving from a subscriber a request to record content and a unique requester key, the network DVR identifying an asset associated with the request. The network DVR divides the asset in to a series of segments, assigns a mediaword to each segment, encrypts each of the segments using an encryption key, and then records the encrypted asset segments into an encrypted dictionary storage as definitions, i.e., dictionary entries. The encryption key and the mediaword are forwarded to a requester handler flow in the network DVR that generates encrypted copies, specific to a subscriber, of the encryption key and possibly the mediaword using the requester key received from the subscriber. The mediaword and encrypted encryption key are stored in a requester's content storage.

Figure 1:
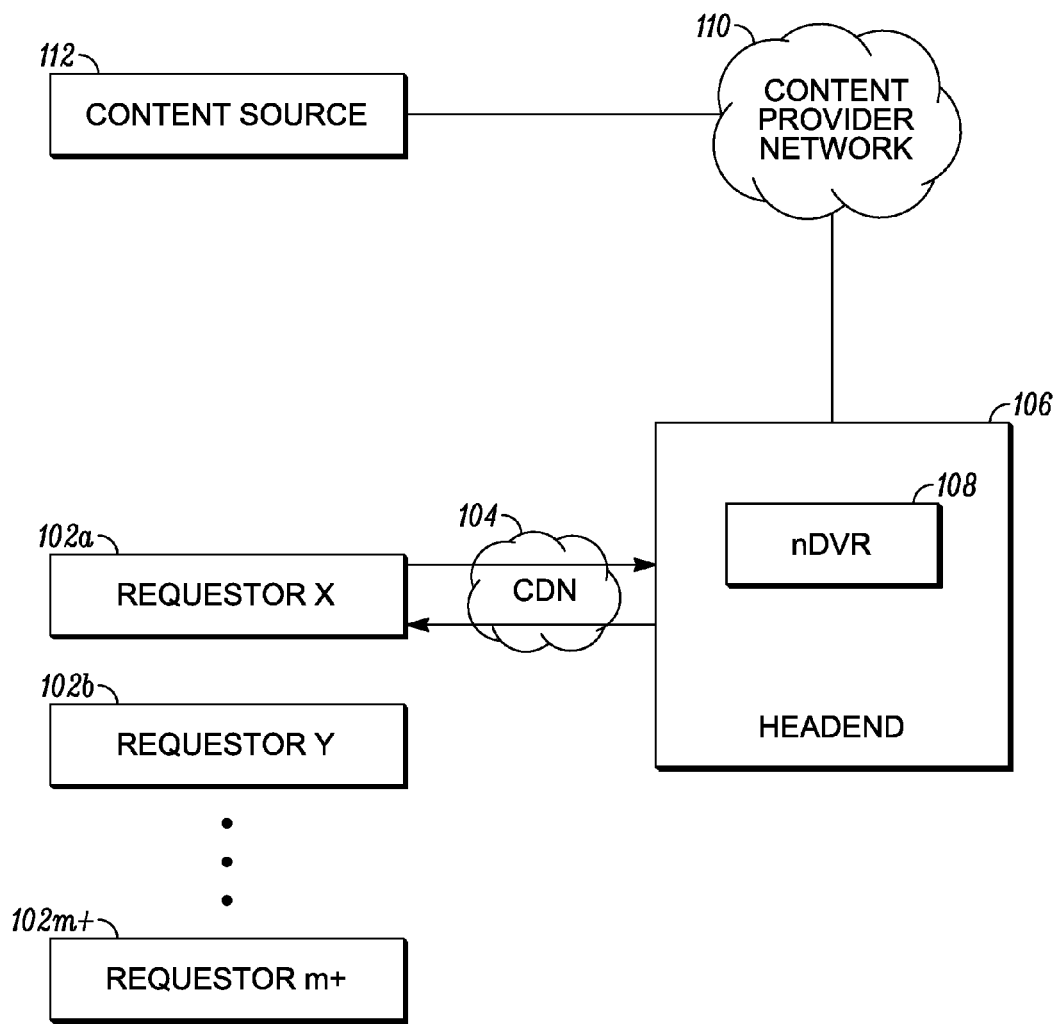
FIG. 1 depicts a high level illustration of a representative operating environment for implementing mediaword compression for nDVR systems.

FIG. 1 depicts a high level illustration of a representative operating environment 100 for implementing the disclosed techniques. The operating environment 100 includes requesters 102a-m+, a service provider's content delivery network 104 and headend 106 with a network DVR 108, a content provider network 110, and a content source/programmer 112.

In embodiments, the service provider receives content over a content provider network 110 from a content programmer 112 via a headend 106, which may include content servers in the service provider's domain. The content programmer 112 may include any entity that provides media content to a headend 106 in the service provider's domain for distribution by the service provider to subscribers. A non-limiting example of a content programmer 112 is the Entertainment and Sports Programming Network (ESPN)®, which creates media content by televising sporting events and developing television programs, movies, etc. Another non-limiting example of a content programmer is the Turner Broadcasting System (TBS)®, which also broadcasts media content, such as television programs, sporting events, and movies. The content provider network 110 represents any number of possible cable or content provider networks and manners for distributing content (e.g., satellite, fiber, the Internet, etc.).

The service provider is responsible for delivering media content received from the content programmer 112 to users, e.g., subscribers 102a-m+. A service provider is a cable operator, such as a cable and broadband service operator, that provides cable and/or Internet services to subscribers, and operates content delivery networks, such as network 104. The service provider may, for instance, be a multiple service operator (MSO) network, telecommunications company, or satellite broadcaster, which includes, for example, local cable companies, such as Verizon®, Cox®, Comcast®, etc., and satellite media companies, such as DirecTV®, Dish Network®, etc. References to the service provider are used generally herein to encompass entities in an infrastructure in the domain of the service provider 106, such as the headend 106, network DVR 108, or content delivery network 104, for example.

The service provider's headend, e.g., headend 106, is a master facility operated by the service provider for receiving television signals for processing and distributing content over a cable television system. The headend 106 may be a regional or local hub that is part of a larger service provider distribution system, such as a cable television distribution system. The service provider uses the content delivery network 104 to distribute television programs to requesters 102a-102m+, such as by transmitting radio frequency (RF) signals through a network of headends or nodes connected via coaxial cables, and/or transmitting light pulses through a network of fiber-optic cables.

As used herein, a subscriber, customer, requester, and the client device, through which the subscriber issues requests/commands to the servicer provider, are used interchangeably. For example, subscribers 102a-m+ are referred to as requesters in the context of the disclosed techniques, where the subscribers of the cable network are requesting content from the network DVR. In other examples where reference is made to a requester, it is understood that this may refer to the subscriber that uses a client device to request content, or may refer to the client device itself that communicates with network elements to transmit the request. For example, the client devices 102a-m+ may transmit a request to record content over the content delivery network 104. The subscriber initiates the request, but may use the client device as the conduit for delivering the request, for example, to the service provider.

The content delivery network 104 may be a cable data network such as an all-coaxial or a hybrid-fiber/coax (HFC) network. Of course, other broadband access networks such as xDSL (e.g., ADSL, ADLS2, ADSL2+, VDSL, and VDSL2) and satellite systems may also be employed. In embodiments, the content delivery network 104 comprises, for example, a packet-switched network that is capable of delivering IP packets directly to client devices 102a-m+ using, for example, a cable data network, PON, or the like.

Examples of a content delivery network 104 include networks comprising, for example, managed origin and edge servers or edge cache/streaming servers. The content delivery servers, such as edge cache/streaming server, deliver content (e.g., via one or more wired and/or wireless telecommunication networks, not pictured) to subscribers 102a-m+. In an illustrative example, content delivery network 104 comprises communication links connecting each distribution node and/or content delivery server to one or more client devices, e.g., for exchanging data with and delivering content downstream to the connected client devices. The communication links may include, for example, a transmission medium such as an optical fiber, a coaxial cable, or other suitable transmission media or wireless telecommunications. In an exemplary embodiment, content delivery network 104 comprises a hybrid fiber coaxial (HFC) network.

A client device 102a-m+ may be any device on which content can be viewed and/or recordings scheduled. Multiple client devices may be associated with a single requester 102a-m+ or subscriber account. For example, recordings may be scheduled via one consumer device on an account of the requester, and then played back on the same or different devices associated with that requester's account. Non-limiting examples of client devices associated with a user or subscriber 102a-m+ may include a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices may implement video compression techniques, such as those described in the standards defined by MPEG-2, MPEG-4, ITU-T H.263 or ITU-T H.264/MPEG-4, Part 10, Advanced Video Coding (AVC), the upcoming High Efficiency Video Coding (HEVC) standard, and extensions of such standards, to transmit and receive digital video information more efficiently. The client device may include a graphical user interface (GUI) that will provide the consumer to request content delivery, change settings, etc.

A network based recording service may utilize a network based digital video recorder (nDVR) 108, where the nDVR represents a device for storing the recorded content at the network. As shown in FIG. 1, a network DVR 108 is shown residing in the headend 106, but it should be understood that nDVR 108 functionality may exist elsewhere in the service provider's domain. The service provider may utilize a plurality of nDVR servers on which media content associated with a plurality of subscribers may be stored.

The nDVR 108 stores content for subsequent transmission to a set top box in response to a user request, providing the subscriber with functionality that is typically available when a subscriber employs a local DVR. For example, an nDVR 108 is stored at the provider's central location rather than at the consumer's private home, and subscribers can utilize the network for recording content, rather than (or in addition to) requiring a local device or local storage. Thus, unlike traditional DVRs, which require an appliance containing a hard drive to be placed in the home of the subscriber, the network DVR may store content on servers at the cable operator's broadcast facilities.

The nDVR 108 offers a service in which real-time broadcast television is captured in the network on a server, and the content can be selected later for playback. The nDVR content is similar to live content in that the content is packaged for delivery to the user in real time, but playback is expected to be after the fact. Thus, the nDVR 108 provides time-shifted viewing of broadcast programs, allowing subscribers to record and watch programs at their convenience, without the requirement of a local recording device. Similar to a personal video recorder at the user's home, the nDVR 108 allows the end user 102a-m+ to access recorded programs at will rather than being restricted to the scheduling of the live broadcast from the content programmer 112.

The content may be provided to the network DVR 108 from any available content source, such as the content programmer 112, for example. When a requester 102a-m+ wishes to record content delivered by the content programmer 112, the subscriber may issue a request via a client device to the service provider to record the content in the service provider's network digital video record (nDVR) 108. nDVR subscribers 102a-m+ can choose from programs available in the network-based library of content provided by a content programmer 112, without needing yet another device or remote control.

Other user input requests associated with a conventional DVR can also be serviced by a network DVR, including, for example, trick play modes of operation. In some trick play modes of operation, the nDVR 108 can, via user interface 102*a-m+*, rewind or fast-forward a program being played back. For instance, a user interface such as a remote control may have dedicated keys or buttons that rewind or fast-forward through the currently playing program. In rewind mode, the program may be presented at the normal presentation rate or at one or more frame rates that are higher than the normal presentation frame rate. For instance, the rewind button on the remote control of a conventional DVR is often preprogrammed to rewind through a program at 1, 4, 16, or 30 times the normal frame rate, depending on how many times the rewind button is depressed.

In embodiments, the nDVR 108 records copyrighted television programs for later personal viewing. The content provider or service provider may be required to store recordings, such as those protected by copyright, uniquely for each individual subscriber or subscriber account. Thus, the nDVR may be legally required to specifically store or uniquely designate the storage of recordings in the network requested by a client on behalf of the requesting client, even in the case where multiple subscribers record the same content.

Disclosed are techniques for recording and providing playback functionality in a network DVR that is specific to a requested content corresponding to the requesting customer. In other words, the requester views a copy that he requested. In embodiments, the requester only has access to individualized nDVR content associated with an explicit request by that user, regardless whether other requesters have requested similar or the same content.

Figure 2:
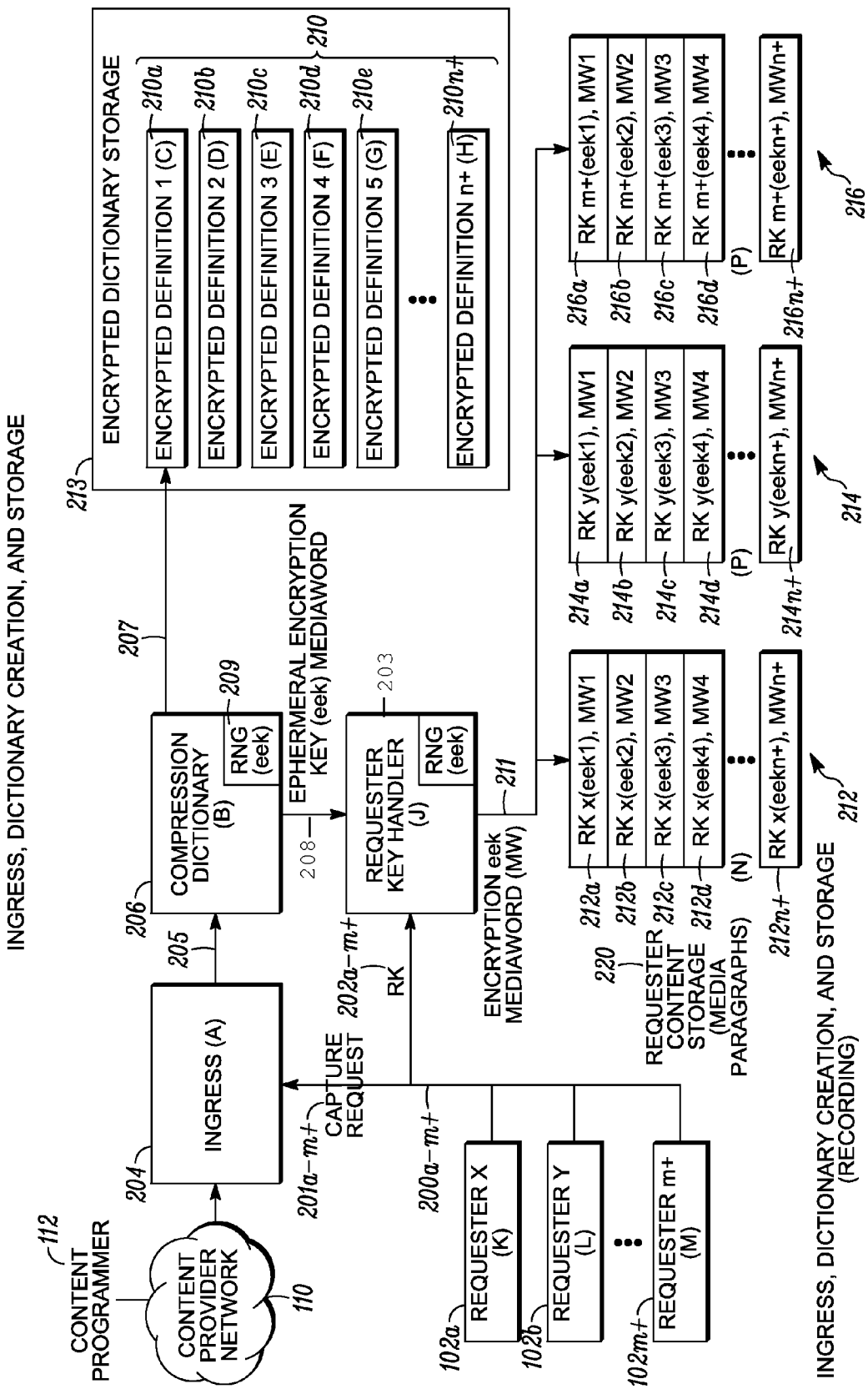
FIG. 2 demonstrates a network DVR in a network storage environment operable to handle storing content for individual requesters.

FIG. 2 demonstrates a network DVR 108 in a network storage environment operable to handle storing content for individual requesters 102*a-m+*. FIG. 2 depicts an example of the ingress, dictionary creation, and storage (recording) by the network DVR, with unique access and storage for each requester 102*a-m+*. As described below, the techniques provide unique compressed recordings for each user. Each recording in the network DVR causes an encrypted dictionary to be built. Each requester of the recording has a uniquely recoverable decryption key and a mediaword to recover content from the dictionary, such that the content recorded in the encrypted dictionary storage 213 is individualized in the requester content storage 220 for each requester. Thus, each requester has an individualized access to a recording associated with the request such that the content is only accessible by requesters.

As shown in FIG. 2, the recording process starts with one or more requesters 102*a-m+* (requesters X, Y, and/or m+) requesting a recording via a respective user account or client device. Thus, the requester initiates the process for a network DVR recording. The content requested may be any type of multimedia content, such as movies, television programs, music, radio, slide shows, etc.

A request initiated by a requestor 102*a-m+* may take a number of different forms. By way of example, when a requester wants to record content, the requester 102*a-m+* activates a client device and, via a user interface on the client device, inputs a request to record a particular content. In an example, a user may initiate a recording at the network DVR 108 via the pressing of a button on an in-home remote control, selecting from content options available from the content programmer 112. In an example, the user may interact with a graphical user interface on the client device 120*a-m+* to choose content for recording. The client device or the GUI on the client device may communicate over the content delivery network 104 to notify the service provider of the request for recording the content via notification 200.

The notifications 200*a-m+* shown in FIG. 2 represent requests from each of the requesters 102*a-m+*, respectively. Each notification 200*a-m+* to the service provider includes a capture request 201*a-m+* and a requester key (RK) 202*a-m+*. A capture request identifies the media content requested for recording by the requester. The requester key is an encryption key unique to the requester. Thus, both the capture request and the requester key include information originating with and/or unique to the requester. It is noted that the requester key may not be the actual key used if, for example, the key is obfuscated via any number of cryptographic techniques. Such methods of obfuscation are well known and are not discussed herein.

Each capture request 201*a-m+* identifies the media content requested by a requester for recording at the network DVR, such that each capture request is associated with at least one requester and identifies the content requested by the at least one requester. Each requester key 202*a-m+* is an encryption key unique to a specific requester, and it may be generated in any suitable manner. For example, the client device associated with a requester may generate the requester key, or the requester key may be assigned to the client device, such as assigned by the service provider. The network DVR receives each requester key 202*a-m+* and hands the keys to a requester key handler 203. Thus, each requester 102*a-m+*, by requesting content, causes a unique requester key 201*a-m+* to be provided to the network DVR.

The requester key 202*a-m+* may be uniquely associated with a respective requester 102*a-m+* or the requested media content in a number of different ways. Non-limiting examples are described herein. For example, in embodiments, any requests originating from a requester's premises is associated with a unique requester key. In embodiments, a requester key is unique to any requests originating from a subscriber account. In embodiments, the requester key may be unique to a client device, regardless of how many are located within the premises or associated with a subscriber's account. In embodiments, the requester key may be newly generated upon each request for content.

Considering now the ingress portion of FIG. 2, the source of content represented in this example is a content programmer 112 that delivers content to the network DVR via the content provider network 110. Media content from the content source flows to an ingress 204 recording portion of the network DVR 108. Upon receipt of a capture request 201 *a-m+* at ingress 204, the network DVR 108 is able to identify content received at the ingress 204 that is associated with the capture request 201 *a-m+*. The network DVR 108 matches the sporting event requested in the capture request to content related to the sporting event received from the content programmer 112. The media content received from the content programmer 112 and associated with the capture request 201*a-m+*, e.g., the sporting event in this example, is provided at 205 to a compression dictionary creator 206.

In embodiments, ingress 204 may tune the network DVR to capture content identified in the capture request 201*a-m+*. For example, if requester 102*a* requests a recording of a particular sporting event, the capture request 201*a* identifies the sporting event to the network DVR 108. In embodiments, the capture request 201*a-m+* informs the ingress when to tune to a channel to record the requested media content.

The network DVR 108 divides the media content received from the content programmer 112 and associated with the capture request 201*a-m+* into segments of a finite duration, like a paragraph divided in to sentences. The compression dictionary creator 206 generates an encryption key for encrypting each media segment associated with the requested content. In embodiments and for purposes of examples described herein, the encryption key 209 is an ephemeral encryption key (eek), and the encryption key generator 209 is a random number generator (RNG).

At 207, the compression dictionary creator 206 forwards the encrypted media segments to the encrypted dictionary storage 213, thereby writing each encrypted media segment to the encrypted dictionary storage 213 as definitions 210a-n+ that represent the segmented media content 210. For example, the compression dictionary creator 206 may encrypt one second long segments of the media content associated with a capture request as it is received from the content programmer, and pass the encrypted media segment to the encrypted dictionary storage 213. If an hour long media content is received and recorded in one second segments, for example, 3600 one second long segments may be encrypted and stored in the encrypted dictionary storage 213. For purposes of illustration, a media content 210 with encrypted segments 210a-n+ is illustrated in FIG. 2, where eek1 refers to the key used to generate encrypted dictionary entry 210a, eek2 refers to the key used to generate encrypted dictionary entry 210b, eek3 refers to the key used to generate encrypted dictionary entry 210c, etc.

In addition to encrypting the media segments, the compression dictionary creator 206 performs compression on the media segments via the assignment of a unique mediaword for each dictionary entry 210a-n+, i.e., for each segment of the media content in the encrypted dictionary storage 210. Each mediaword identifies the dictionary location of a corresponding encrypted media segment. The encrypted definition, or encrypted media segment, is larger in memory, e.g., bit size, than the mediaword itself. Thus, a different mediaword represents each media content segment and compresses the dictionary entry into a mediaword reference. In embodiments, the compression is done in real time as the media content is received and segmented.

In a simplified example, the compression dictionary creator 206 assigns mediawords MW1,MW2, MW3, MW4, . . . MWN for a media content with N encrypted media segments, i.e., a mediaword is assigned for each of the N media segments. In the example shown in FIG. 2, assume that MW 1 is assigned to encrypted media segment 210a, MW 2 is assigned to encrypted media segment 210b, MW 3 is assigned to encrypted media segment 210c, etc. It is noted that the embodiment illustrated by FIG. 2 represents a scenario in which the content storage has mediawords that are the same, which may not always be the case. For example, client #1 may have requested a recording to have started one minute earlier and client #3 may have requested the content end two minutes later. Thus, for simplicity, FIG. 2 is depicted with the same identifier for each mediaword, but it should be understood that in practice, MW2 for one client may actually the be the first mediaword available for a second client.

At 208, for each encrypted media segment 210a-n+ entered in to the encrypted dictionary storage 213, the compression dictionary creator 206 forwards the eek used to encrypt the media segment and the mediaword assigned to the segment to the requester key handler 203. Thus, for each media segment with a capture request 210a-n+, the compression dictionary creator 206 both a) writes an encrypted media segment 210a-n+ to the encrypted dictionary storage 213 and b) provides the associated eek and mediaword associated with the dictionary index of the encrypted media segment 210a-n+ to the requester key handler 203.

Upon receipt of each encryption key at 208, the requester key handler 203 encrypts the encryption key using a requester key for provision to a requester content storage 220. As described above, associated with the capture request 201a-m+ identifying content to record, provided to the requester key handler 203 is a requester key 202a-m+ associated with the requester 102a-m+ of the content. In embodiments described herein, the notification 200a-m+ issued by the requester includes a capture request 201a-m+ portion that identifies the requested content (or otherwise causes the key to be requested) and the requester key 202a-m+ portion with the requester key unique to the requester 102a-m+.

The encryption keys received by the requester key handler 203 at 208 from the compression dictionary creator 206 are thereby associated with the capture request 201a-m+ portion initiated by the requester 102a-m+, whereby each encryption key received is the encryption key used by the compression dictionary creator 206 to encrypt a segment of the requested content identified in the capture request 201a-m+. The requester key handler 203, uniquely for each requester that has requested content encrypted by an eek, encrypts each eek received at 208 using the requester's requester key 202a-m+. Because each eek is associated with an encrypted dictionary entry 210a-n+ that has been compressed via assignment of a mediaword, the requester key handler 203 thereby generates requester-specific encrypted copies of each encryption key for each mediaword. In embodiments, the requester key handler 203 also encrypts the mediaword with the requester's requester key.

FIG. 2 illustrates examples on behalf of each requester 102a-m+, where the requester-specific encrypted copies of the encryption key in the requester content storage 220 are represented as x(eek1)–x(eekn+), i.e., encrypted copies of the encryption key specific to requester 102a (Requester X), y(eek1)–y(eekn+), i.e., encrypted copies of the encryption key specific to requester 102b (Requester Y), m+(eek1)–m+(eekn+), i.e., encrypted copies of the encryption key specific to requester 102m+(Requester m+). Each eek associated with a respective requester is encrypted differently for each respective mediaword.

As described above, the requester key handler 203 forwards the mediaword and requester-specific encrypted eek at 211 to the requester content storage 220. By way of example, FIG. 2 depicts copies 212, 214, and 216 associated with requesters 102a, 102b, and 102m+, respectively. Representative copies 212, 214, and 216 are unique in content, i.e., a unique copy is stored for each requester of said content.

In an example, at 208, a first eek, eek1, associated with mediaword 1, MW1,i.e., encrypted definition 210a, is forwarded to the requester handler 203. The requester handler 203 encrypts the eek individually with the unique requester key for each requester that has issued a capture request 201a-m+ identifying content 210a that is associated with the MW1. The requester-specific encoded eek for MW1 is forwarded to the requester content storage 220. The example requester content storage 220 represents the unique storage of each encrypted ephemeral encryption key for MW1 for each requester, shown in storage slot 212a as x(eek1) for Requester X 102a, shown in storage slot 214a as y(eek1) for Requester Y 102b, and shown in storage slot 216a m+(eek1) for Requester m+ 102m+. It is noted that since the requester key is unique to a requester, the encryption key encrypted by the requester key is thereby also unique to the requester (e.g., x(eek1)–x(eekn+) is uniquely encrypted for Requester X, y(eek1)–y(eekm+) is uniquely encrypted for Requester Y).

The encryption and storage in the requester content storage 220 continues for each segment of content associated with each requester's request(s) for content. For example, for the second segment 210b of content encrypted by the compression dictionary creator 206, the eek corresponding to the encryption for MW2, e.g., eek2, is provided to the requester handler 203. The requester handler 203 encrypts eek2 with the requester key 202a-m+ for each requester that has requested content corresponding to MW2, i.e., encrypted definition 210b. In this example, requesters X, Y, and m+ requested content associated with MW2, and the encrypted encryption key for each requester is shown in storage slot 212b as x(eek2) for Requester X 102a, in storage slot 214b as y(eek2) for Requester Y 102b, and in storage slot 216b m+(eek2) for Requester m+ 102m+.

Thus, for each media segment 210a-n+ encrypted and stored in the encrypted dictionary storage 210, a mediaword, MW1-n+ and an eek is generated. For a requester to have a storage slot in the requester content storage 220 with an encrypted eek and mediaword, the requester has requested the content via a notification 200 such that the requester's requester key can be used for encrypting the ephemeral encryption key(s) 209 and/or the mediaword(s) associated with the content.

Because the network DVR may handle recording of the same content on behalf of a plurality of requesters, a plurality of the individual capture requests 201a-m+ may be associated with the same content. For example, requesters 102a and 102b may request a recording of the same television program. Notification 200a from requester 102a and notification 200b from requester 102b each includes a requester key 202a and 202b associated with the respective requester, 102a, 102b, and each notification includes a capture request 201a, 201b, that identifies the content requested. In the scenario in which the requesters 102a and 102b are requesting the same television program to be recorded by the network DVR 108, capture requests 201a and 201b may therefore identify the same television program.

However, by creating individual storage slots in the requester content storage 220 for storing encryption keys and mediawords on behalf of each requester, the storage is tailored to the requester's request. Each storage slot is unique to each user and each request, regardless of how many other requesters have requested the same content. For example, if Requester X 102a requests content prior to the live broadcast of a sporting event, and Requester Y 102b requests content of the same sporting but in the middle of the broadcast, e.g., during the broadcast of the content associated with segment 210c assigned MW3, the information in the storage slots 212, and 214 will be different, i.e., tailored to the request of each user. Storage slot 212 for requester Y 102b, for example, would not include the information for segments 210a or 210b and therefore would not have access to playback the first two segments of the media content.

In other words, embodiments are described in which only requesters of content will have access to network DVR content storage, and the requester only has access to content unique to that requester. Because each requester is provided with a unique copy of eek, only the requester may retrieve the encrypted dictionary entry (i.e., encrypted media segment).

It is noted that while disclosed herein are examples of a request for a media content by a requester, the same techniques apply for a requester that makes a plurality of requests for recording multiple media events. The multiple media contents requested by a single requester may be overlapping media events. In such embodiments, the requester key used to encrypt the media segments on behalf of the requester may be the same or the key may vary. For example, the same requester key may be used to encrypt the media segments for each media content. In another example, a different requester key may be issued for each media content, or a requester key may be used for a limited duration of time.

In embodiments, once the compression dictionary creator 206 encrypts a media segment using an eek and forwards the eek to the requester key handler, the compression dictionary creator 206 discards the 'eek. Thus, the eek generated by the compression dictionary creator may disappear from the network DVR once it is handed to the requester key handler, as the compression dictionary creator 206 no longer has a valid use for the eek. In this manner, no other subscriber or user of the network DVR will have access to the encryption key because it only exists in the requester content storage, which is encrypted individually and uniquely for each requestor. Thus, access to the compressed encrypted dictionary storage is controlled by access to the keys secured on a per user basis.

By way of a non-limiting example to illustrate embodiments of the disclosed techniques, described below is the nDVR functionality when requester X (102a) sends a notification 200a to the network DVR 108. In this example, notification 200a identifies a news program the requester X would like the network DVR 108 to record. The notification 200a includes both a capture request 201a that identifies the news program and a requester key 202a that is unique to the requester 102a.

Upon receipt of the capture request 201a at the network DVR, the network DVR identifies the media content from content received from the content programmer 112. In this example, the network DVR identifies the requested news program from the media content. In embodiments, the media content, e.g., the news program, is identified based on a time period in which the media content is scheduled to be broadcast by the content programmer 112. Any suitable manner for matching the media content identified capture request 201a to the corresponding content received from the content programmer 112 is contemplated.

Assume that the capture request 201a from requester 102a in this example identifies a news program that is scheduled to air at 8 pm on Monday, which is some time in the future. As the content programmer 112 transmits the news program, each second of content forwarded to the compression dictionary creator 206 is processed as a separate media segment. Thus, when the network DVR begins receiving content from the content programmer 112 at the scheduled time, the news program is divided in to segments.

The media segments may be equal in duration or the segments may be divided at varying lengths to efficiently handle the rate of transmission of the media content (e.g., if the transmission rate is not continuous, the chunks of media segments may have varying durations). In this example, we will assume that the news program is a one hour program and the media segments are sent to the compression dictionary creator 206 every second.

For each media segment of the news program received at the compression dictionary creator 206, the compression dictionary creator 206 generates an ephemeral encryption key, eek, and encrypts the media segment. Each encrypted media segment of the news program corresponding to capture request 201a is then stored in the encryption dictionary storage 210. The compression dictionary creator 206 assigns a mediaword to each encrypted media segment to create an index for each encrypted media segment of the news program. Thus, following receipt of the entire news program, 3600 encrypted media segments 210a-n+(n=3600) for the news program, each associated with a mediaword and each encrypted with a different encryption key, is stored in the encrypted dictionary storage 210.

Assume in this example that the requester 102a does not interrupt the recording of the entire news program such that the capture request results in a recording of the entire news program (i.e., all 3600 encrypted media segments are to be available to the requester 102a as associated with the capture request 201a). To create a copy of the news program for the requester 102a for playback by the requester, the compression dictionary creator 206 forwards an eek and a mediaword associated with each of the 3600 encrypted media segments to the requester key handler 203, which already has a requester key 202a associated with the requestor 102a.

Copy 212 represents the copy of the news program available to requester 102a via the unique encryption storage by the network DVR. As shown in the embodiment in FIG. 2, copy 212 is only accessible to requester 102a because the encryption key used by the compression dictionary creator 206 to encrypt each media segment is encrypted by requester 102a's requester key, a requester key that is unique to requester 102a and not available or known to any other requester.

As shown by copy 212, each media segment is identified in storage slots 212a-n+ by mediawords MW1,MW2 . . . MWn+. In this example, MW1 is the mediaword that corresponds to the encrypted media segment 210a of the news program. The x(eek1) represents the encryption key used by the compression dictionary creator 206 to encrypt the media segment 210 represented by MW1. The requester key handler 203 encrypts encryption key eek1 using the requester 102a's requester key 202a. The requester key RK, the encryption key that encrypts the media segment encrypted by the requester key x(eek1), and the mediaword MW1 are included in each requester content storage slot for copy 212, e.g., for 212a the requester content storage depicts storage of "RK x(eek1), MW1."

In this example the capture request included all 3600 media segments of the news program. Thus, for the next media segment, represented by MW1 in the encrypted dictionary storage 210, the requester content storage similarly stores a copy, e.g., an encrypted copy, of the encryption key eek2 used to encrypt the second media segment. The requester key handler 203 encrypts the key eek2 using the requester 102a's requester key. Thus, for MW2 that corresponds to the media segment 210b encrypted by eek2, requester content storage slot 212b depicts "RK, x(eek2), MW2" representing the stored requester 102a's requester key 202a, eek2 encrypted uniquely for requester 102a (requester x) by the requester key 202a, and the MW2.

For a different requester of the same content, such as requester 102b (requester Y), copy 214 in the requester content storage represents requester 102b's unique access to the encrypted media segments 210a-n+. Thus, for the example above, Copy 214 represents requester 102b's unique access to the news program that is also requested by requester 102a in this example. As shown by 214a-n+, an encrypted copy of each encryption key eek1-eekn+ used to encrypt the encrypted media segments 210a-n+ is encrypted by requester 102b's requester key 202b. Thus, each segment 210a-n+ of a media content is associated with a requester key, an eek encrypted based on the requester key for the requester 102a, e.g., (x(eek1)-x(eekn+), and a mediaword, e.g., MW1-MWn+). Thus, the same mediaword may be stored in the requester content storage for multiple requesters, but the index in to the encrypted dictionary storage is different between each user, thereby limiting content to a requester only if the requester has requested content that corresponds to the mediaword, in this case MW1.

In embodiments, the capture request is made prior to the broadcast of the program by the content programmer 112, i.e., requests are for content that is occurring currently or are upcoming. For example, in embodiments a requester cannot request content that has occurred previously, even if the same content has been recorded on behalf of a request from another requester.

Each requester has their own accessible copy of content via the requester content storage 220 and a requester key 202a-m+ such that each copy is secure, i.e., only accessible by entities associated with the requester key 202a-m+. For example, requester 102a cannot access requester 102b's content because requester 102a does not have a proper key. As described above, the compression dictionary creator 206 discards an eek after passing the eek to the requester key handler 203. Thus, in embodiments, each eek is only accessible to a requester having a requester key that corresponds to the requester key used by the requester key handler to encrypt the ephemeral key. Since the requester key is unique to a requester, only the requester will therefore be able to decrypt each eek needed to decrypt each encrypted media segment.

Embodiments are disclosed herein that do not employ a common copy, i.e., a single video stored and copied for anyone that requests it, or the excess storage required to duplicate the full video for every requester that requests the content. Rather, the unique content stores are unique copies of requester information for accessing the requested media content, where the requester causes the access content to be recorded and the access content is provided only to a specific user such that the media content is only available to a an original requester of the content that caused entries in the content store to be made.

While FIG. 2 depicts an example of a request for the same media content 210a-n+ by a plurality of requesters 102a-m+, the process is scalable to a plurality of requests for different media content. For example, media content 210a-n+ represents the segments for a single media content, but the encrypted dictionary storage 213 may store media segments for a plurality of media contents. Similarly, copies 212, 214, and 216 stored in the requester content storage represent recordings requested by requesters 102a-m+ of the media content 210a-n+, where the eek1-eekn+ keys used to encrypt media segments 210a-n+ are included with each copy 212, 214, 216. But, each copy 212, 214, 216 is unique due to the encryption by each requester's requester key. Thus, a unique copy of requester information is stored on behalf of each requester for only content for which the requester has provided an explicit capture request 201a-m+. The copies of the encryption keys are only accessible by the requester 102a-m+ due to the encryption and storage of the requester information in the network DVR for each requester.

It is noted that the capture request 201a may include time identifying information for the desired program. In embodiments, the capture request 201 includes a timestamp identifying a start time and end time of the news program. In embodiments, the capture request includes a specific time period for recording. The capture request 201 may identify a recording that occurs at a future time. The recording may be a single request for a recording or it may be a recurring request to record a specific program or to record during a specific time period.

The capture request 201a may identify media content that is live, e.g., the media content is currently streaming to ingress 204 from the content programmer 112. In embodiments where the network DVR does not begin recording media content until it receives an explicit request from a requester, the media segments encrypted by the compression dictionary creator are those that occur at a time in the media content following the time that the request is made. Thus, if the capture request 201a is received from the requester 102a for the news program after the start time of the news program, the recording will begin upon processing of the request, i.e., midstream in the news program.

Further, a requester may stop a request for a recording of a content during mid-broadcast of the content from the content programmer 112. In this instance, the requester key handler ceases encryption of an encryption key associated with media segments processed after the stop record request. For purposes of example, assume that the requester 102a stops a record request during broadcast of what would be segmented in to segment 210c in the encrypted dictionary storage. The requester content storage would no longer receive requester information following that associated with segment 210c, such that copy 212 would only include slots 212a, 212b, and 212c. If there were no other requesters requesting the content, the compression dictionary creator 206 would also cease segmenting and encrypting media segments for content that followed segment 210c (such segments would not have a practical use if encrypted with a key that is not associated with any requesters).

In embodiments, using a different eek for encrypting each media segment in the encrypted dictionary storage enables granularity such that a requester can stop recording midstream without having to record content stores for content that is no longer desired or requested. Other requestors 102a-m+ may cause a continued recording of content store entries related to the media content for additional segments regardless of what another requester causes to be stored. Thus, while possible to use a single eek for encrypting an entire media content, the result may be unnecessary recording. For example, if a user desires only a first portion of the media content, e.g., segments corresponding to MW1,MW2, and MW3, a single key used to encrypt the entire media content would result in storage in the content store related to all of the media segments 210a-n+.

If in the example above in which requester 102a stops recording at segment 210c, but requester 102b continues a request for recording the entire content, the compression dictionary creator 206 continues individually encrypting and storing the encrypted segments on behalf of requester 102b in the encrypted dictionary storage 210. However, while the compression dictionary creator 206 continues recording the media content on behalf of requester 102b, however, requester 102a no longer has access to the media segments that follow segment 210c (corresponding to the stop record request from requester 102a). Thus, embodiments are disclosed that illustrate how the copies of the encrypted key that are encrypted by the requester key unique to a user can limit access of content to only a requesting user and the level of access is limited to the explicit request. In embodiments, a common copy is not created but, rather, original content is encrypted and stored in a manner that provides individual access such that no user can access content unless the user has explicitly made a request to have their own copy of access information.

The exact length of each copy 212, 214, 216 is a function of the total length of the media content, the size of each encrypted media segment of the media content in the encrypted dictionary storage, and/or the start and end time of the request in the capture request. For purposes of example, assume that the requester 102a, in the example above requesting a recording of the news program, sends the request at a time later than the start time of the news program, i.e., content programmer 112 has already started broadcasting the news program. For example, assume the request by requester 102a is sent at a time that corresponds to the timing of content broadcasted and segmented in to media segment 210c. The requester key handler 203, therefore, would not have uniquely encrypted the encryption keys associated with MW1 and MW2 for requester 102a, and so slots 212a and 212b would not be entered in to the requester content storage 220. In other words, storage accessible by a specific requester is not initiated unless the same requester explicitly requests a recording of the content. Further, the content stored in requester content storage may be restricted by the start and end time in the capture request 102a. For example, if MW1 and MW2 were stored, they would not have value if the key for retrieving them from the encrypted dictionary storage was not available based on the capture request 102a.

Similarly, in embodiments, a media content is not recorded unless explicitly requested by at least one requester. For example, the media segments 210a-n+ related to the news program are assumed, in this example, to have been requested by at least one requester. Some programs or media contents may never be recorded in to the network DVR if no requester has requested to record the content. Likewise, even if multiple requesters request the media content, the network DVR does not begin segmenting, encrypting, and storing the content in to the encrypted dictionary storage 213 until initiated by at least one of the requesters. For example, if the first requester of a particular media content does not initiate the recording at the start time of the content, the media segments in the encrypted dictionary storage 213 will begin with the first segment of content following the first requester's request. In other words, what is stored in the network DVR is on both a request-basis and a requester-basis. As shown by embodiments, techniques disclosed enable unique copies of requester information to be available to limit access by requesters and limit access by requesters to only that content to which they explicitly request.

Described below is an example using the disclosed techniques in a specific implementation that demonstrates a significant savings in data storage. For simplicity, described herein is a system for recording a single 'channel' of content. However, the implementation scales easily to multiple 'channels'.

In this example, the requested content is an MPEG2 HD television show (hereinafter "television show") that is one hour in length and received at a bit rate of 19 Mbps (8.5 GBytes). Also in this example, there are 500,000 subscribers in the cable television network, 5% of which have requested the television show. Thus, there are 25,000 recordings requested (i.e., 25,000 capture requests 201 and requester keys 202 provided to the network DVR).

The media content associated with the requested television show is passed from the ingress 204 to the compression dictionary creator 206. In this example, the media content is segmented in to segments that are each one second long. The eek length is 16 bytes, the mediaword length is 4 bytes, and the entry in the encrypted dictionary storage 213 is 20 bytes.

Thus, for a 1 hour television show, the amount of storage for a copy for a single requester is 20 bytes*3600=72 Kbytes (or 0.072 Mbytes).

Without the mediaword compression disclosed herein, 25000 recordings would take 25,000*8.5 Gbytes of storage (approx. 213 Terabytes of storage for a single one hour television show).

With mediaword compression, 25,000 recordings use 25,000*0.072 Mbytes+8.5 Gbytes (approximately 1.8 Gbytes+8.5 Gbytes=10.3 Gbytes for a single, one hour television show).

The amount of storage saved is a 99.995% improvement with mediaword compression.

In another example using MPEG4, similar storage savings can be realized. The same television show discussed above would be stored at approximately 7 Mbps=3.2 Gbytes. For 25,000 requests, 25,000*3.2 Gbytes=75 Terabytes (in contrast to 5 Gbytes without mediaword compression). The amount of storage saved in this example is a 99.99% improvement with mediaword compression.

The above examples are provided for a single one hour television show. Expand that to an estimated average of 10 requested recordings for one hour television shows, per week, per requested, and using an estimated example that the average lifetime of content in storage is about two weeks.

Using the MPEG4 compression scheme for a standard data storage model requires 42,5000 terabytes of storage (500,000 subs*8.5 Gbytes*10 television shows). For a web service that charges $35 per terabyte to store content for a month, 42,5000 terabytes of storage at $35/month=$1.5 million spent per month on storage costs ($17.85 million annually).

Using the disclosed mediaword compression techniques with the same example data points, only 6.7 terabytes of storage are used (500,000 subs*0.072 MB media content copy*10 shows+3.2 Gbyte dictionary*1000 shows*2 weeks=6.7 terabytes of storage. Thus, the same web service would only charge $245/month for storage (6.7 terabytes*$35), or $2940 ($0.003 million) annually.

Thus, as the examples demonstrate above, significant savings in both storage and cost can result by using the disclosed mediaword compression techniques. Even if the estimated numbers are modified 10:1 in favor of the prior techniques, a savings of approximately $2 million dollars annually ($4/subscriber) can be realized.

Figure 3:
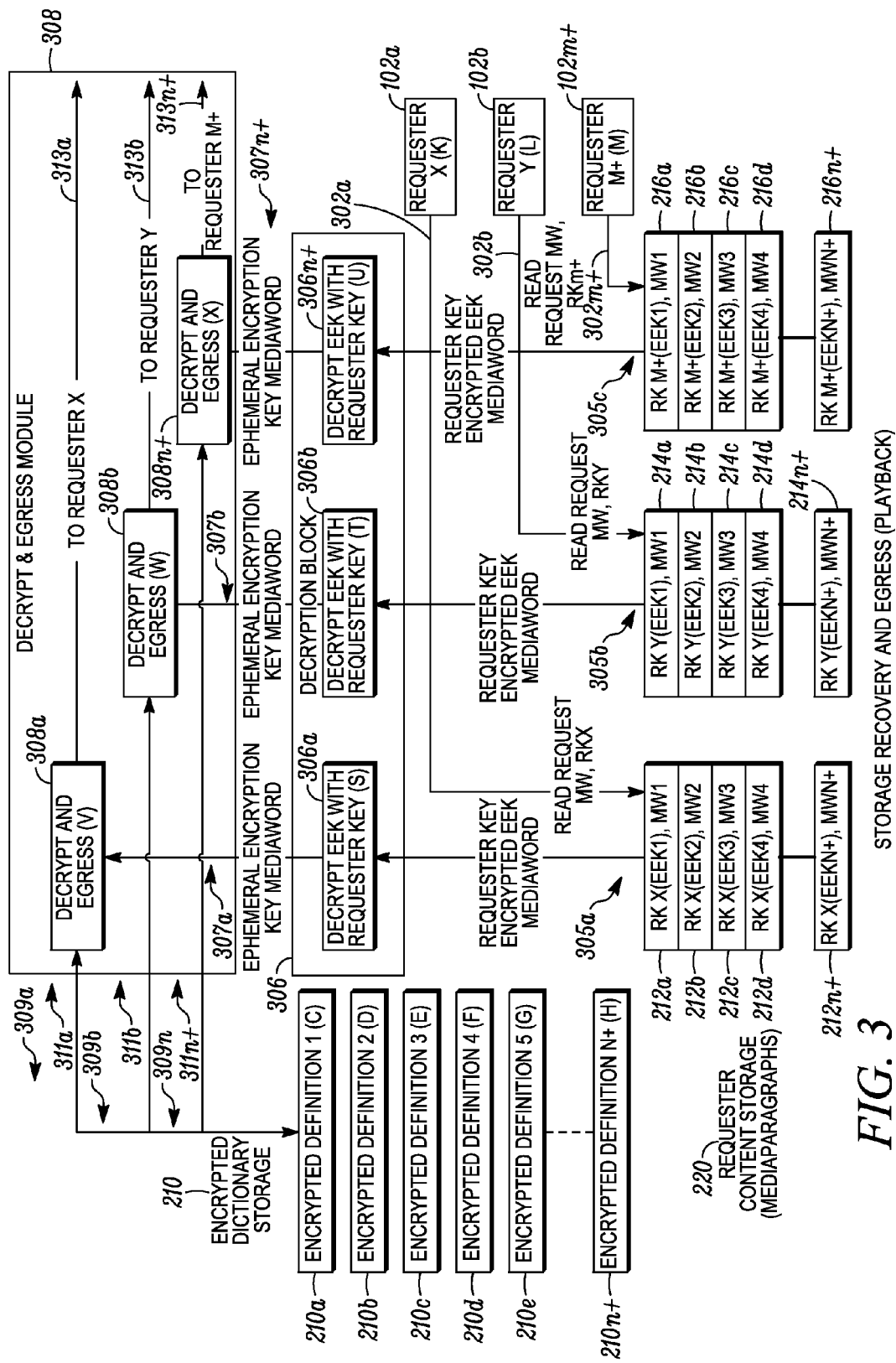
FIG. 3 depicts examples of the network DVR storage recovery and egress (playback) operations.

FIG. 3 depicts examples of the network DVR storage recovery and egress (playback) operations. The requester can use the mediaword and the unique copy of eek, the generation of both which is described with respect to FIG. 2, to retrieve the encrypted dictionary entry/media segment, e.g., 210a-n+, from the encrypted dictionary storage 210. As described herein, each mediaword indexes the location of the corresponding encrypted media segment 210a-n+ in the encrypted dictionary storage 213 for easy retrieval of an encrypted media segment. Instead of one second worth of video stored for each user in the dictionary, for example, the mediaword identifies an index of the media segment in the encrypted dictionary storage 210.

FIG. 3 illustrates the use of a mediaword for each encrypted media segment for identifying a media segment to be decrypted for playback. A requester 102a-m+ initiates playback of a recording by sending a playback request 302a-m+. Thus, the requester initiates the processing for a playback request in the network DVR. The playback request 302 includes an identity of the requester's requester key and mediaword. Upon receipt of a request 302, the network DVR passes the corresponding requester's key and mediaword at 303 to the requester content storage 220.

As shown in FIG. 2, copies of content associated with each requester's 102a-m+ request for recorded content are stored as encrypted media segments 212, 214, and 216, which may include encrypted keys and media words, in the requester content storage 220 for each requestor 102a-m+, respectively. Each encrypted media segment 212a-n+, 214a-n+, 216a-n+ includes an eek specific to the requester (encrypted by the requester's unique requester key) and a mediaword for each encrypted media segment (the mediaword identifies the entry/location/position of the segment in an encrypted dictionary storage 210).

In response to a playback request 302 from the user, at 305, the network DVR forwards the requestor's requester key, the encrypted eek, and the requester key to a decryption block 306. Thus, for a first playback request, e.g., request 302a identifying MW1, the first instance of the storage that corresponds to MW1 in the requester content storage, 212a, is forwarded to the decryption block 306.

The decryption block 306 decrypts the eek with the corresponding requester key. At 307, the decryption block 306 forwards the decrypted eek and mediaword to a Decrypt and Egress module 308. At 309, the Decrypt and Egress uses the eek used to encrypt the desired media segment and the mediaword that identifies the desired media segment. Based on the mediaword, the decrypt and egress module 308 fetches a definition, i.e., looks up the encrypted media segment in the encrypted dictionary storage associated with the mediaword, and decrypts the encrypted media segment with the eek. Thus, the eek that was discarded at 208 in FIG. 2, and unusable by any other requester, is recovered by the decrypt and egress module 308 and provided to the requester 102a. At 313, the decrypt and egress module outputs an original definition to the requester.

The disclosed techniques may minimize storage costs by replicating a minimal amount of data. Any one of many requesters 102a-m+ can request the system to start capturing and recording content. However, until at least one requester 102a-m+ has made such a request, the system will not store data. To store data, the system breaks the data into two parts (1) encrypted definitions of small, fixed sizes, and (2) mediawords to find those encrypted definitions in the definition storage 213. After a definition is stored, the encryption key for that definition is lost to the definition storage system. An encrypted version of that key, specific to the requester 102a-m+, is stored along with the mediaword in the requester content storage 220, so that the definition can only be retrieved by a specific requester. The requester content storage 220 is a very compressed representation of the media. Thus, as multiple requesters request the same content to be captured and recorded, the storage requirement for media grows linearly within the very compressed requester content storage 220, and not within the definition storage (which only grows when new content is captured and not as a function of the number of requesters).

In embodiments, the disclosed techniques ensure that each recording in the network DVR is tied specifically to a single requester. In embodiments, the disclosed techniques include a network DVR mechanism where requesters have access to requested content only instances in which recordings are requested ahead of time.

In embodiments, a method comprises receiving a request for playback of content from a requester associated with at least one request to record content, wherein the request for playback of content includes an identity of the requester's requester-specific encryption key and the mediaword assigned to a desired encrypted segment; forwarding the requester's requester-specific encryption key and the encrypted variable encryption key used to encrypt the desired encrypted segment associated with the mediaword to a decryptor; recovering the variable encryption key by decrypting using the requester's requester-specific encryption key; fetching the desired encrypted segment identified by the mediaword from storage; decrypting the encrypted media segment with the recovered variable encryption key.

Figure 4:
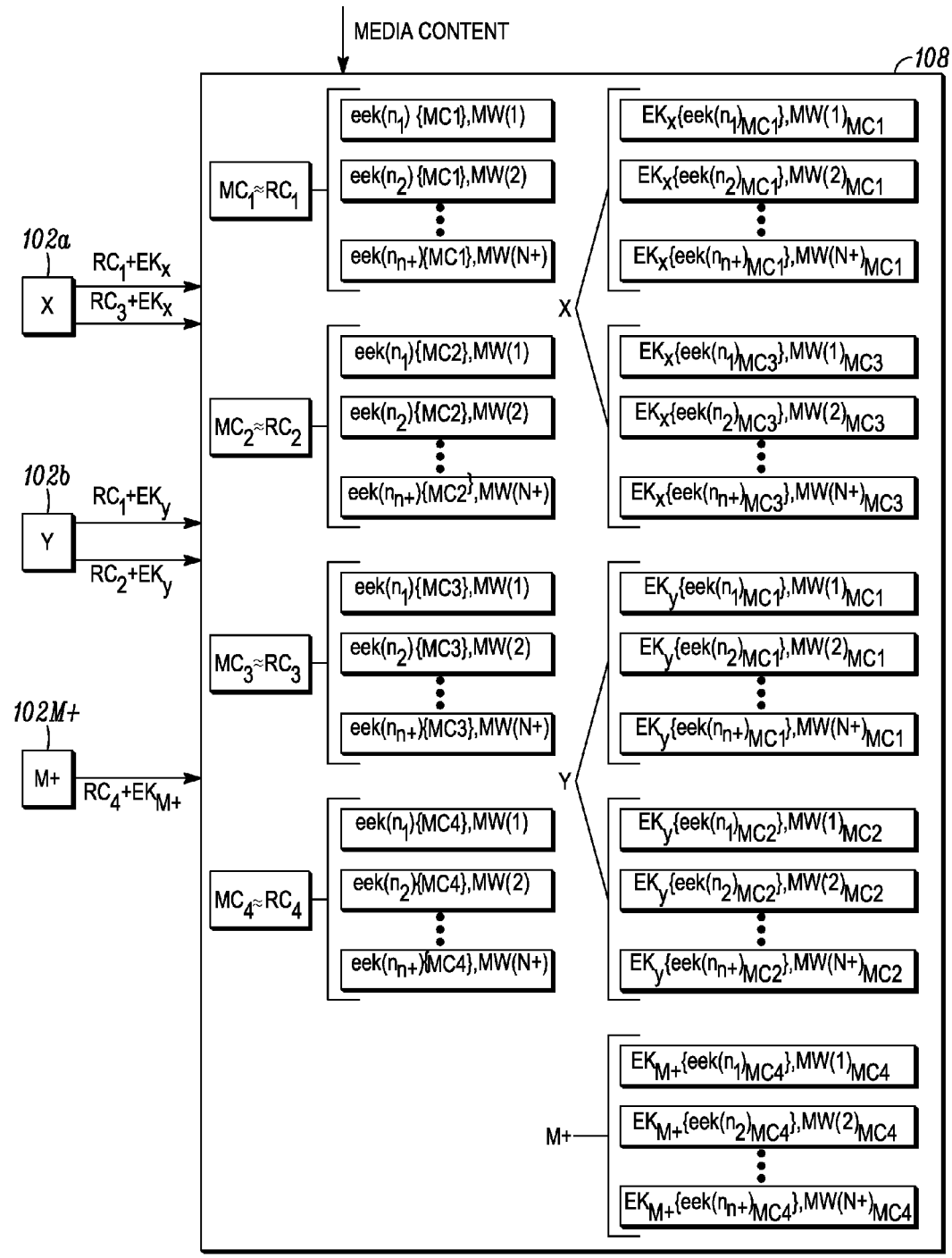
FIG. 4 depicts an example embodiment for secure delivery of content using mediaword compression and content encryption.

FIG. 4 depicts an example embodiment of the disclosed techniques described herein for secure delivery of content using mediaword compression and content encryption. The network digital media recorder 108 comprises an input for receiving requests from a plurality of requesters to record content.

Each of the requests to record content includes an identity of the requested content and a requester-specific encryption key. As shown in FIG. 4, the plurality of requesters 102a-m+ are represented by Requester X, Requester Y, and Requester m+. For purposes of illustration, a limited number of requesters and requests for content are described to represent the processing for such requests by the disclosed network DVR. For example, Requester X is shown issuing two requests for content (requested content referred to as "RC"), $RC_1$ and $RC_2$. As described above, $EK_x$ is a requester key specific to Requester X and is provided by Requester X to the network DVR. Thus, for Requester X, each of the requests to record content includes both the request for content and the requester's unique requester key, $RC_1+EK_x$ and $RC_3+EK_x$. Requester Y issues two requests, $RC_1+EK_y$, and $RC_2+EK_y$. Requester m+ issues a request $RC_4+EK_{m+}$. The processor forwards the identity of the requested content to an ingress and forwards the requester-specific encryption key to a requester key handler, as depicted in FIG. 2.

At 402, the media content is received, and one or more media contents are identified that are associated with the requests to record content. As shown, media content (MC) $MC_1$ is associated with $RC_1$, $MC_2$ is associated with $RC_2$, $MC_3$ is associated with $RC_3$, and $MC_4$ is associated with $RC_4$. For each of the associated one or more media contents, $MC_1$, $MC_2$, $MC_3$, and $MC_4$, segments of each media content are encrypted and stored. A compression dictionary creator 206 may generate a variable encryption key for each segment of each media content to be encrypted. Each encrypted media segment stored is assigned a mediaword, which indexes the encrypted segment's location in storage. As shown in FIG. 4, $MC_1$ is segmented in to n+ segments, each encrypted with a variable encryption key. The encrypted segments for $MC_1$ are represented as $eek(n_1)\{MC_1\}$, $MW(1)$; $eek(n_2)\{MC_1\}$, $MW(2)$; $eek(n_{n+})\{MC_1\}$, $MW(3)$. Similarly, $MC_2$, $MC_3$, and $MC_4$ are segmented, each segment is then encrypted with an encryption key generated separately for each segment, and a mediaword is assigned to each encrypted segment stored in a network DVR storage location.

For each of the plurality of requesters and for each requester's request to record content, the network DVR identifies the encrypted segments that correspond to the requester's request to record content, and encrypts, using the requester's requester-specific encryption key, each of the variable encryption keys used to encrypt each of the encrypted segments that corresponds to the respective requester's request to record content. Each of the requester-specific encrypted variable encryption keys and the mediaword assigned to the respective encrypted segments are stored in a requester content storage.

For example, for Requester X's request $RC_1+EK_x$, the network DVR stores, for each segment of the media content associated with the request for $RC_1$, a variable encryption key encrypted using Requester X's requester key $EK_x$, and the mediaword identifying the storage location of the corresponding encrypted segment. In this example, the requester content storage stores, on behalf of Requester X, the encrypted variable encryption keys and mediawords for requested contents $RC_1$ and $RC_2$. The requester content storage for Requester X depicts, for $RC_1$: $EK_x\{eek(n_1)_{MC1}\}MW(1)_{MC1}$; $EK_x\{eek(n_2)_{MC1}\}MW(2)_{MC1}$; $EK_x\{eek(n_{n+})_{MC1}\}MW(N+)_{MC1}$ and for $RC_2$: $EK_x\{eek(n_1)_{MC2}\}MW(1)_{MC2}$; $EK_x\{eek(n_2)_{MC2}\}MW(2)_{MC2}$; $EK_x\{eek(n_{n+})_{MC2}\}MW(N+)_{MC2}$.

Similarly, the requester content storage depicts the encrypted variable encryption keys and mediawords for media contents 1 and 3, MC1 and MC3, on behalf of Requester Y, and for media content 4 on behalf of Requester M+.

Thus, each variable encryption key used to encrypt a respective media content segment is only recoverable by a requester associated with a requester-specific encryption key used to encrypt the variable encryption key. Only the requester associated with the requester-specific encryption key is provided access to the encrypted segments of the associated media content to prevent a rebroadcast of the media content.

As shown in the example figures, disclosed are techniques for receiving, at a network server, requests from a plurality of requesters to record content, wherein each of the requests to record content includes an identity of the requested content and a requester-specific encryption key; identifying one or more media contents received at the network server that is associated with one or more of the requests to record content; for each of the associated one or more media contents, encrypting segments of the media content using a variable encryption key generated for each segment; assigning a mediaword to each of the encrypted segments; and for each of the plurality of requesters and for each requester's request to record content: identifying the encrypted segments that correspond to the requester's request to record content, encrypting, using the requester's requester-specific encryption key, each of the variable encryption keys used to encrypt each of the encrypted segments that corresponds to the respective requester's request to record content, and storing, in a network server location, each of the requester-specific encrypted variable encryption keys for each encrypted segment and the respective mediaword assigned to the respective encrypted segment.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The encrypted dictionary storage 213 and the requester content storage 220 represent data storage devices operable to save copies of content. These and other elements described herein represent storage capabilities that may include physical storage and/or memory media such as RAM, ROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

I claim:

1. A network digital media recorder comprising:
    an input for receiving requests from a plurality of requesters to record content, wherein each of the requests to record content includes an identity of the requested content and a requester-specific encryption key,
    a processor for forwarding the identity of the requested content to an ingress and for forwarding the requester-specific encryption key to a requester key handler;
    the ingress for receiving media content and identifying one or more media contents that is associated with the requests to record content;
    a compression dictionary creator for:
        for each of the associated one or more media contents, encrypting segments of each media content using a variable encryption key generated for each segment;
        assigning a mediaword to each of the encrypted segments;
    the requester key handler for, for each of the plurality of requesters and for each requester's request to record content received at the network digital video recorder:
        identifying the encrypted segments that correspond to the requester's request to record content, and
        encrypting, using the requester's requester-specific encryption key, each of the variable encryption keys used to encrypt each of the encrypted segments that corresponds to the respective requester's request to record content, and
    a requester content storage for storing each of the requester-specific encrypted variable encryption keys and the mediaword assigned to the respective encrypted segments.

2. The network digital media recorder of claim 1, wherein each variable encryption key used to encrypt a respective media content segment is only recoverable by a requester associated with a requester-specific encryption key used to encrypt the variable encryption key.

3. The network digital media recorder of claim 1, wherein only the requester associated with the requester-specific encryption key is provided access to the encrypted segments of the associated media content to prevent a rebroadcast of the media content.

4. The network digital media recorder of claim 1, wherein the assigned mediaword identifies a location within storage that the respective encrypted segment is located.

5. The network digital media recorder of claim 1, further comprising creating individual storage slots in a requester content storage on behalf of each requester for storing encrypted variable encryption keys and mediawords.

6. The network digital media recorder of claim 1, further comprising:
    receiving a request for playback of content from a requester associated with at least one request to record content, wherein the request for playback of content includes the identity of the requester's requester-specific encryption key and the mediaword assigned to a desired encrypted segment;
    forwarding the requester's requester-specific encryption key and the encrypted variable encryption key used to encrypt the desired encrypted segment associated with the mediaword to a decryptor;
    recovering the variable encryption key by decrypting using the requester's requester-specific encryption key;
    fetching the desired encrypted segment identified by the mediaword from storage;
    decrypting the encrypted media segment with the recovered variable encryption key.

7. A method comprising:
receiving, at a network server, requests from a plurality of requesters to record content, wherein each of the requests to record content includes an identity of the requested content and a requester-specific encryption key;
identifying one or more media contents received at the network server that is associated with one or more of the requests to record content;
for each of the associated one or more media contents, encrypting segments of the media content using a variable encryption key generated for each segment;
assigning a mediaword to each of the encrypted segments; and
for each of the plurality of requesters and for each requester's request to record content:
identifying the encrypted segments that correspond to the requester's request to record content,
encrypting, using the requester's requester-specific encryption key, each of the variable encryption keys used to encrypt each of the encrypted segments that corresponds to the respective requester's request to record content, and
storing, in a network server location, each of the requester-specific encrypted variable encryption keys for each encrypted segment and the respective mediaword assigned to the respective encrypted segment.

8. The method of claim 7, wherein the assigned mediaword identifies a location within storage that the respective encrypted segment is located.

9. The method of claim 7, further comprising creating individual storage slots in a requester content storage on behalf of each requester for storing encrypted variable encryption keys and mediawords.

10. The method of claim 7, further comprising, for each of the plurality of requesters and for each requester's request to record content, encrypting, using the requester's requester-specific encryption key, the assigned mediaword for each of the encrypted segments that corresponds to the requester's request to record content.

11. The method of claim 7, further comprising discarding the generated variable encryption key after the respective encrypted segment is encrypted.

12. The method of claim 7, further comprising:
receiving a request for playback of content from a requester associated with at least one request to record content, wherein the request for playback of content includes an identity of the requester's requester-specific encryption key and the mediaword assigned to a desired encrypted segment;
forwarding the requester's requester-specific encryption key and the encrypted variable encryption key used to encrypt the desired encrypted segment associated with the mediaword to a decryptor;
recovering the variable encryption key by decrypting using the requester's requester-specific encryption key;
fetching the desired encrypted segment identified by the mediaword from storage;
decrypting the encrypted media segment with the recovered variable encryption key.

13. The method of claim 7, wherein each variable encryption key used to encrypt a respective media content segment is only recoverable by a requester associated with a requester-specific encryption key used to encrypt the variable encryption key.

14. The method of claim 13, wherein only the requester associated with the requester-specific encryption key is provided access to the encrypted segments of the associated media content to prevent a rebroadcast of the media content.

15. A method comprising:
receiving, at a network digital media recorder, a request to record content, wherein the request includes an identity of the requested content and a requester-specific encryption key;
identifying media content received at the network digital media recorder that is associated with the requested content;
encrypting segments of the associated media content in accordance with the request to record content, wherein each of the encrypted segments is encrypted using a respective variable encryption key;
assigning a mediaword to each of the encrypted segments, wherein each assigned mediaword identifies a storage location of a respective encrypted segment;
encrypting each variable encryption key using the requester-specific encryption key, wherein encrypting each variable encryption key using the requester-specific encryption key comprises:
receiving the requester-specific encryption key associated with the requester,
receiving the variable encryption key used to encrypt each encrypted segment of one or more media contents associated with requests to record content received at the network digital media recorder;
identifying the encrypted segments associated with the requester's request to record content;
encrypting, based on the requester's requester-specific encryption key, the variable encryption key for each identified encrypted segment.; and
storing, in a network digital media recorder location, each of the requestor-specific encrypted variable encryption keys associated with each of the encrypted segments and the mediaword assigned to each of the encrypted segments,
wherein each variable encryption key encrypted with the requester-specific encryption key is recoverable only to a requester associated with the requester-specific encryption key, thereby limiting access to each of the encrypted segments encrypted to the requester of the requested content.

16. The method of claim 15, wherein the requester causes the requester-specific encryption key to be provided to the network digital media recorder upon issuing a request to record content.

17. The method of claim 15, further comprising:
receiving a request for playback of content from the requester, wherein the request for playback of content includes an identity of the requester's requester-specific encryption key and the mediaword assigned to a desired encrypted segment;
forwarding the requester's requester-specific encryption key and the encrypted variable encryption key used to encrypt the desired encrypted segment associated with the mediaword to a decryptor;
recovering the variable encryption key by decrypting using the requester's requester-specific encryption key;
fetching the desired encrypted segment identified by the mediaword from storage;
decrypting the encrypted media segment with the recovered variable encryption key.

18. The method of claim 15, wherein only the requester associated with the requester-specific encryption key is provided access to the encrypted segments of the associated media content to prevent a rebroadcast of the media content.

19. A non-transitory computer-readable storage medium having stored thereon instructions that, when executed, cause a processor to:
identify media content received at a network digital media recorder that is associated with a request to record content;
encrypt segments of the associated media content in accordance with the request to record content, wherein each of the encrypted segments is encrypted using a respective variable encryption key;
assigning a mediaword to each of the encrypted segments, wherein each assigned mediaword identifies a storage location of a respective encrypted segment;
encrypting each variable encryption key using a requester-specific encryption key received with the request to record content; and
store each of the requestor-specific encrypted variable encryption keys associated with each of the encrypted segments and the mediaword assigned to each of the encrypted segments,
wherein each variable encryption key encrypted with the requester-specific encryption key is recoverable only to a requester associated with the requester-specific encryption key, thereby limiting access to each of the encrypted segments encrypted to the requester of the requested content.

* * * * *